United States Patent
Taylor et al.

(10) Patent No.: US 12,468,684 B1
(45) Date of Patent: Nov. 11, 2025

(54) SNAPSHOT CONSISTENCY IN A KUBERNETES PLATFORM

(71) Applicant: Dell Products L.P., Round Rock, TX (US)

(72) Inventors: Alan L Taylor, Cary, NC (US); David J Maddison, Weston (GB)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 19/013,352

(22) Filed: Jan. 8, 2025

(51) Int. Cl.
*G06F 16/23* (2019.01)
*G06F 11/14* (2006.01)

(52) U.S. Cl.
CPC ...... *G06F 16/2365* (2019.01); *G06F 11/1469* (2013.01); *G06F 2201/80* (2013.01)

(58) Field of Classification Search
None
See application file for complete search history.

(56) References Cited

U.S. PATENT DOCUMENTS

2025/0023772 A1* 1/2025 Juneja ............... H04L 41/40

* cited by examiner

*Primary Examiner* — Eddy Cheung
(74) *Attorney, Agent, or Firm* — Amin, Turocy & Watson, LLP

(57) ABSTRACT

Ensuring snapshot consistency in a Kubernetes platform is presented. For instance an example method can comprise in response to receiving a management operation from a data analytics engine user interface, determining that the management operation is an executable operation that manipulates a first data resource of a group of data resources and a second data resource of the group of data resources, based on the management operation being the executable operation, generating a custom resource representing an operation in progress custom resource, in response to executing the operation in progress custom resource, manipulating the first data resource and the second data resource by facilitating execution of the management operation; determining that the management operation has completed manipulating the first data resource and the second data resource, and in response to determining that the management operation has completed execution, deleting the custom resource.

20 Claims, 10 Drawing Sheets

SNAPSHOT CONSISTENCY IN A KUBERNETES PLATFORM

BACKGROUND

Kubernetes is platform designed to automate the deployment, scaling, and management of containerized applications. Containerized applications are software applications packaged together with all their dependencies, libraries, and configuration files into self-contained units called containers. Containerized applications ensure that applications run consistently across different environments, from development to production, regardless of variations in operating systems or infrastructure.

Kubernetes manages the lifecycle of containers, including deployment, scaling, and updates, automatically restarts failed containers, replaces unresponsive ones, and reschedules workloads when nodes fail, distributes network traffic across containers to ensure reliability and performance, supports horizontal scaling (adding/removing instances) based on resource utilization, uses human-readable data serialization language (e.g., extensible markup languages, such as YAML), or javascript object notation (JSON) file format and/or data interchange format files for infrastructure and application configurations, and operates across various cloud providers, as well as on-premises environments.

Typically, a fundamental Kubernetes architecture can comprise: master nodes that manage a cluster by scheduling workloads and maintaining desired states; and worker nodes that execute containerized applications and workloads. Kubernetes also uses the concept of pods, the smallest deployable unit in Kubernetes, to encapsulate one or more containers, their storage, and networking. Kubernetes supplies services to abstract groups of pods to provide a stable endpoint for accessing the groups of pods; enables load balancing and discovery; defines the desired state for pods, ensuring Kubernetes maintains the specified number and configuration; and provides logical isolation for workloads and resources within a cluster which can be ideal for multi-tenant environments.

A data lake house is a data architecture that combines the best features of data lakes and data warehouses. Data lake houses are designed to address the limitations of traditional data architectures by offering the flexibility and scalability of data lakes with the performance and management features of data warehouses.

A data lake is generally a single store of data including raw copies of source system data, sensor data, social data etc., and transformed data used for tasks such as visualization, advanced analytics, and machine learning. A data lake can include structured data from relational databases (tuples, rows and columns, . . . ), semi-structured data (e.g., comma separated value (CSV) data, log data, extensible markup language data, unstructured data (e.g., email data, document data, portable document format (PDF) data), and binary data, such as image data, audio data, video data, and the like). A data lake can be established within an organization's data centers—on premises, and/or using cloud services—in the cloud.

A data warehouse is a system used for reporting and data analysis and is generally a core component of business intelligence (e.g., strategies, methodologies, and technologies used by enterprises for data analysis and management of business information that can include reporting, online analytical processing, analytics, dashboard development, data mining, process mining, complex event processing, business performance management, benchmarking, text mining, predictive analytics, and prescriptive analytics). Data warehouses are central repositories of data integrated from disparate sources. They store current and historical data organized so as to make it easy to create reports, query and get insights from the data. Unlike databases, they are intended to be used by analysts and managers to help make organizational decisions.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
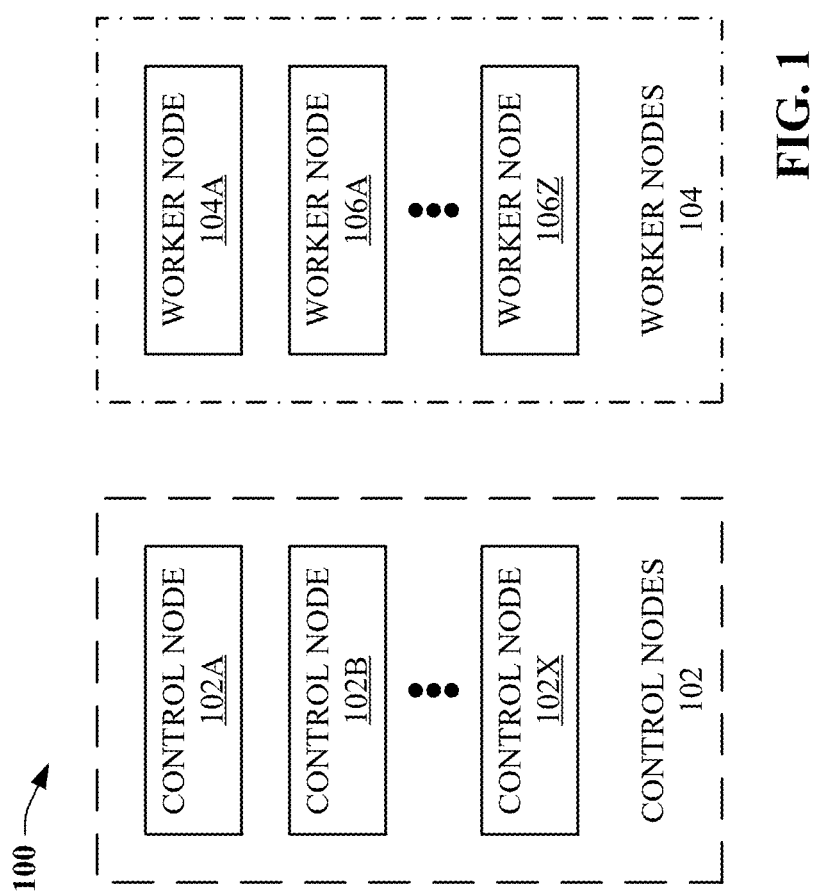
FIG. 1 illustrates a block diagram of a system for ensuring snapshot consistency, in accordance with various non-limiting example embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

In accordance with various example embodiments, a system, apparatus, or device is provided comprising: a processor; and a memory that stores executable instructions that, when executed by the processor, facilitate performance of operations. The operations can comprise: receiving, via a data analytics engine user interface, a management operation, determining, based on the management operation, that the management operation is executable to modify a first data resource of a group of data resources and a second data resource of the group of data resources, in response to determining that the management operation is executable operation to modify the first data resource and the second data resource, generating a custom resource representing an operation in progress custom resource, based on executing the operation in progress custom resource, modifying the first data resource and the second data resource comprising execution of the management operation, determining that the management operation has completed modifying the first data resource and the second data resource, and in response to determining that the management operation has completed the modifying, deleting the custom resource.

In regard to the foregoing, in many embodiments the management operation can be a database creation and schema management operation. In other embodiments the management operation can be a data manipulation operation. In further embodiments the management operation can be a performance optimization operation. In certain embodiments the management operation can be a backup operation or a restore operation. In additional embodiments the management operation can be a security management operation. In other embodiments the management operation can be a data integrity and consistency operation. In yet further embodiments the management operation can be a monitoring and diagnostics operation. In additional and/or alternative embodiments the management operation can be a database scaling operation. In certain additional embodiments the management operation can be a relational database management system structured query language operation. In certain alternative embodiments the management operation can be for storage and retrieval of unstructured data that is not modeled using a tabular relationship as used in relational databases.

In accordance with further embodiments, the subject disclosure describes a method, comprising a sequence of acts that can include: in response to receiving a management operation from a data analytics engine user interface, determining, by equipment comprising one or more processor, that the management operation is an executable operation that modifies a first data resource of a group of data resources and a second data resource of the group of data resources, based on the management operation being determined to be the executable operation, generating, by the equipment, a custom resource representing an operation in progress custom resource, in response to executing the operation in progress custom resource, modifying, by the equipment, the first data resource and the second data resource by facilitating execution of the management operation, determining, by the equipment, that the management operation has completed modifying the first data resource and the second data resource, and in response to determining that the management operation has completed execution, deleting, by the equipment, the custom resource.

In relation to the foregoing, in instances where the custom resource is a first custom resource, the acts can further comprise, prior to generating the first custom resource, determining, by the equipment, that the operation in progress custom resource is in execution. Additional acts can comprise in response to determining that the operation in progress custom resource is in execution, monitoring, by the equipment, the group of resources to determine a time instance when the first custom resource has completed execution, and in response to determining that the operation in progress custom resource has completed execution, instantiating, by the equipment, a second custom resource.

Concerning the foregoing the data analytics engine can be a database query engine that supports high performance analytics across a collection of data sources.

In accordance with still further embodiments, the subject disclosure describes a machine-readable storage medium, a computer readable storage device, or non-transitory machine-readable media comprising instructions that, in response to execution, cause a computing system comprising at least one processor to perform operations. The operations can comprise: in response to receiving a management operation from a data analytics engine user interface, determining that the management operation is executable to manipulate a first data resource of a group of data resources and a second data resource of the group of data resources, based on the management operation being determined to be executable, generating a custom resource representing an operation in progress custom resource, in response to executing the operation in progress custom resource and based on executing the management operation, manipulating the first data resource and the second data resource, determining that the management operation has completed the manipulating of the first data resource and the second data resource, and in response to determining that the management operation has completed the manipulating of the first data resource and the second data resource, deleting the custom resource.

In accord with the foregoing, in many described embodiments the data analytics engine can be a database query engine that supports high performance analytics across a collection of data sources, wherein a data source of the collection of data sources can be a non-relational database management system data source that facilitates management of groups of unstructured data sets. Further in some detailed embodiments the data source of the collection of data sources can be an object storage data management system data source.

In one or more embodiments, a data lake house can be a facility and/or functionality operational on server equipment. In some sample embodiment implantation the data lake house can employ a distributed structured query language (SQL) query engine, such as Starburst Enterprise Platform (SEP), designed to simplify and accelerate analytics across diverse data sources. The distributed SQL query engine enables organizations to query data directly from multiple platforms without the need for data movement or transformation. With the distributed SQL query engine users can facilitate access their data where it resides (e.g., on-premises/on-site equipment, in cloud implemented database equipment clusters, or data resident across hybrid equipment environments) without the need for the movement of data from first database equipment to second database equipment.

In particular, the distributed SQL query engine, in most embodiments, should provide facilities and functionalities related to: unified data access connecting to multiple data sources, including data lakes, data warehouses, and operational databases, from a single interface, and supporting popular cloud storage platforms; high performance SQL optimized for fast, distributed SQL queries on large datasets, using massively parallel processing (MPP) architectures for scalability and speed; data virtualization that combines data from disparate sources into a unified virtual layer, enabling seamless querying without duplication; and enterprise security offering advanced security features like role-based access control, data masking, and integration with enterprise identity systems.

The data lake house implementation is some example embodiments set forth herein can use an enterprise-grade, unified management platform, such as Rancher. The unified management platform should have the ability to work across diverse infrastructures, combined with a focus on security, scalability, and case of use, and simplify the complexities of Kubernetes operations.

In accordance with further example embodiments, the disclosed data lake house implementation can use PostgreSQL, often referred to simply as Postgres, an advanced, open-source relational database management system (RDBMS) known for being robust, extensible, and compliant with SQL standards. It is one of the most powerful and widely-used databases for modern applications. Typically Postgres provides relational and non-relational support. Postgres primarily is an RDBMS but it also can support JSON for NoSQL-like functionality-mechanisms for storage and retrieval of data modeled in means other than the tabular relations used in relational databases. Postgres can also handle structure, semi-structure, and unstructured data. Postgres also provides atomicity, consistency, isolation and durability (ACID) compliance. Additionally, Postgres is extensible and can support custom data types, functions, and operators using plug-ins (e.g., PostGIS for geospatial data) and/or foreign data wrappers. Further, Postgres can implement multi-version concurrency control for high performance transaction management, and provides a panoply of advanced features such as full-text search capabilities, window function and common table expressions for complex queries, and native support for array data types. Moreover, Postgres can handle large scale databases with features such as table partitioning and parallel query execution.

An example deployment of the described subject matter is depicted in FIG. 1. FIG. 1 illustrates an example deployment 100 that includes a group of Kubernetes control plane nodes 102 comprising server equipment 102A, server equipment 102B, . . . server equipment 102X, where A . . . X are increasing integers greater than 0. Each control plane node of the group of Kubernetes control plane nodes 102 can comprise a Postgres implementation, data lake house management processes in execution, and a repository of central management operations (CMOs). Typically, Kubernetes control plane nodes 102 are components/equipment responsible for managing the overall cluster (e.g., the states associated with the group of control plane node 102, as well as any subordinate groupings of nodes, such as groupings of Kubernetes worker nodes 104A and 106) through the use of cluster states and coordinating various Kubernetes worker nodes such as worker nodes 104A and 106A . . . 106Z, where A . . . Z are sequential integer values greater than 0. Kubernetes worker nodes 104A and 106A 106Z, like the group of Kubernetes control plane nodes 102, can be operational on physical server class equipment and/or virtual machine instances of physical server class machines.

Kubernetes worker nodes 104A and 106A. 106Z can run the applications and workloads orchestrated by the Kubernetes control plane nodes (e.g., Kubernetes control plane nodes 102). Kubernetes worker nodes 104A and 106A . . . 106Z are typically responsible for running pods, which generally are the smallest deployable units in Kubernetes and can contain one or more containers.

Figure 2:
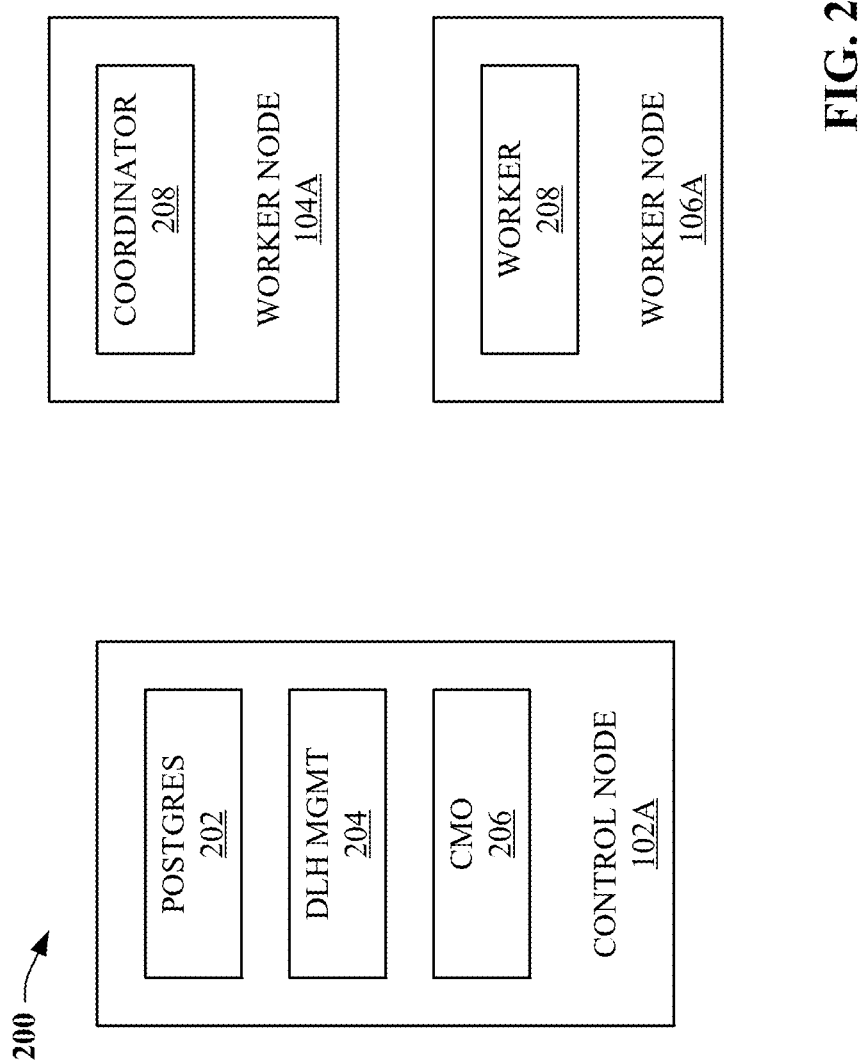
FIG. 2 illustrates a further block diagram of a system for ensuring snapshot consistency, in accordance with various non-limiting example embodiments.

With reference to FIG. 2 that provides additional depiction 200 of a representational example Kubernetes control plane node 102A, representational Kubernetes worker node 104A, and one of the group of Kubernetes worker nodes 106A . . . 106Z (e.g., representational worker node 106A). Example Kubernetes control plane node 102A can comprise postgres facilities and/or functionalities 202, data lake house (DLH) management (MGMT) facilities and/or functionalities 204, and custom management operator facilities and/or functionalities 206. With regard to postgres facilities and/or functionalities 202 these can comprise mechanisms for RDBMS storage and retrieval of data as well as for support for NoSQL-like mechanisms where the storage and retrieval of data in means other than tabular relations used in typical relational databases. Postgres facilities and/or functionalities 202 can also can also handle structured, semi-structured, and unstructured data and provide ACID compliance.

Further, with regard to data lake house (DLH) management (MGMT) facilities and/or functionalities 204 these can comprise software in execution that create a unified platform for data storage, processing, and analytics. The software in execution can offer the scalability and flexibility of a data lake while ensuring the reliability and performance of a data warehouse. Key aspects can include: support for both structured and unstructured data, allowing seamless storage of diverse datasets in a single platform. Robust metadata layers and governance features for efficient data cataloging, versioning, and security. Optimization for fast query execution and analytics using features like caching, indexing, and query optimization. The enabling of a variety of use cases, such as batch processing, real-time analytics, machine learning, and business intelligence, based on the same data. The decoupling of storage and compute aspects, enabling cost optimization based on workload demands, and compatibility with multiple data processing and analytics tools, thereby supporting open standards like SQL and data formats.

In the context of custom management operator (CMO) facilities and/or functionalities 206, are facilities and/or functionalities designed to automate specific tasks, manage resource, or extend the Kubernetes cluster's functionality beyond the built-in capabilities of Kubernetes.

With regard to worker node 104A this particular worker node can comprise a coordinator component (e.g., coordinator 208) of a distributed SQL query engine designed for fast and scalable analytics on large data sets. In particular, coordinator 208 can manage query execution, resource allocation, and cluster orchestration. Coordinator 208 can act as the "brain" of the distributed query engine, ensuring that queries are processed efficiently and resources are utilized optimally amongst subordinate worker nodes (e.g., worker nodes 206A . . . 206Z).

Worker node 106A, this worker node comprises a worker component 210 that handles most of the query execution work, including data retrieval, processing, and computation. The worker component 210 can, for example, execute SQL queries, processes the data, and perform tasks such as filtering, joining, and aggregation; and ensures that queries are divided into smaller tasks that can run in parallel across multiple worker nodes, ensuring high performance.

Customers (e.g., user identities) can perform many different management operations on the data lake house equipment. These operations can modify Kubernetes state (resources, secrets, etc.) and database state to achieve their goal. Kubernetes state and databases are both persistent resources. Management operations are typically referred to as persistent operations. Currently Kubernetes does not offer a two-phase commit primitive to tie multiple persistent operations into a single transaction.

A guiding principle of this disclosure is to ensure, for all customer facing user interface (UI) interactions is to not block. The UI should remain responsive, and any background operation must not impact the customer's experience.

This disclosure discusses the problems that arise with the lack of transactional primitives in management operations and how the disclosure solves these issues.

As noted above there is not a native Kubernetes operation to provide transactional semantics. This is a generic problem the data lake house equipment faces. To create a tangible example, we can illustrate this with the customer facing Connect Catalog (also known as data sources) management operation. However, one can imagine that the pattern described below can apply to other management operations.

Figure 3:
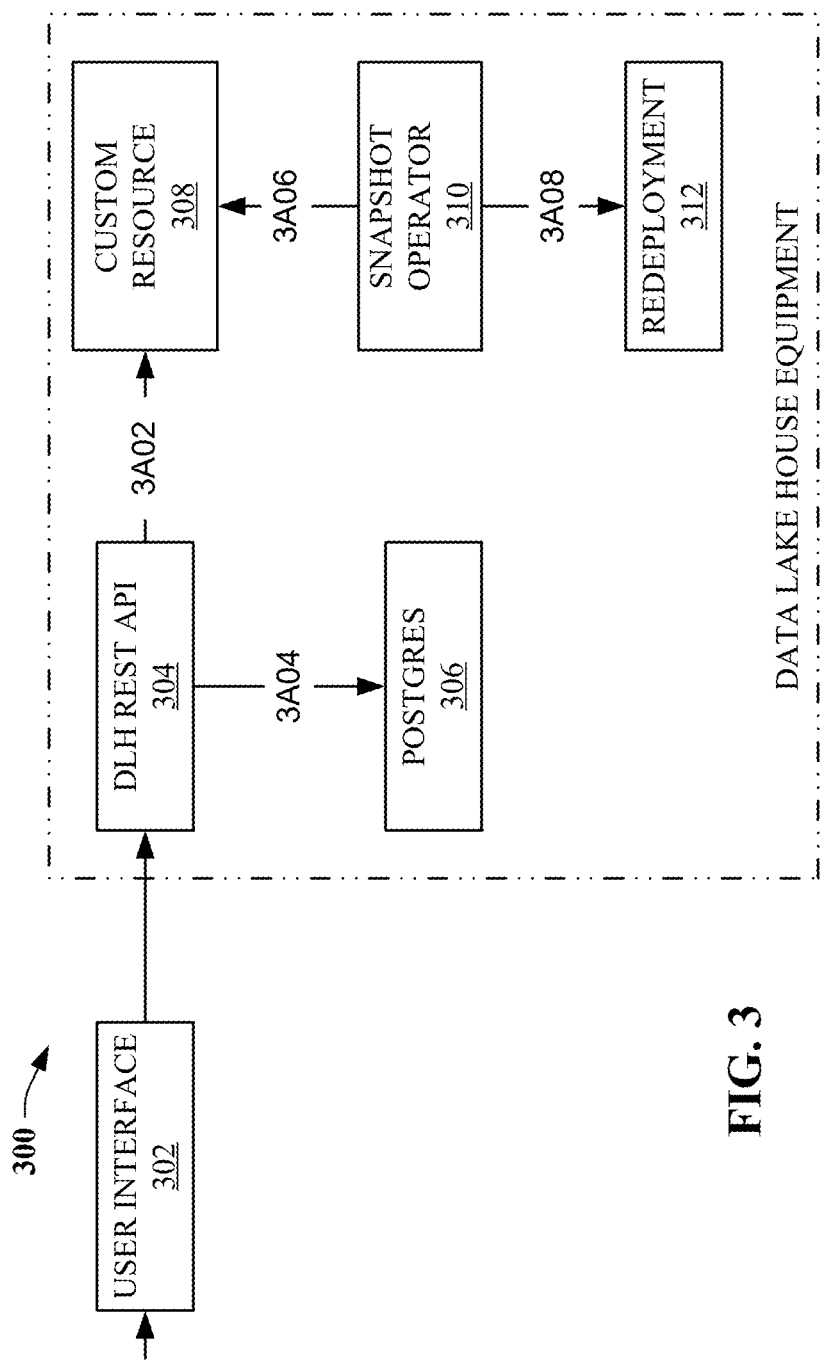
FIG. 3 illustrates another block diagram of a system for ensuring snapshot consistency, in accordance with various non-limiting example embodiments.

As depicted in FIG. 3, in relation to data lake house equipment 300, customers can connect their data sources to data lake house equipment 300 by configuring connection details and authentication methods using user interface 302. The data lake house management software in execution (e.g., DLH REST API component 304) stores the configuration details in the postgres database (e.g., postgres 306). The data lake house management software in execution (e.g., DLH REST API 304) also uses customer input to configure, using Kubernetes custom resources, a data analytics platform (e.g., snapshot operator 310) designed to simplify and accelerate data-driven decision-making. In regard to data analytics platform 310, in some embodiments, this can be a starburst enterprise platform (SEP).

Once the customer has performed the initial configuration tasks above, the high-level flow for an example configure data source operation can be (i) that the customer initiates the data source operation using user interface 302; (ii) the user interface 302 communicates the data source operation to the DLH REST API component 304; and (iii) the DLH REST API component 304 performs the following actions: (a) creates, using an operation associated with the data analytics platform 310, a Kubernetes custom resource operation 308 (e.g., act 3A02) to drive (e.g., act 3A08) the redeployment (e.g., redeployment 312); and (b) updates data in the postgres database 306 (e.g., act 3A04). With regard to act 3A06, the data analytics platform 310 can monitor (e.g., periodically and/or continuously) the data analytics platform 310 to determine whether or not there have been changes in status caused by the creation and/or implementation of the Kubernetes custom resource operation 308 at act 3A06.

For purposes of this disclosure, the most important aspect of the created Kubernetes custom resource operation 308 is that there can be two pieces of "persistent" data being updated in a custom resource operation.

Data lake house equipment vendors are introducing the notion of creating a snapshot of the cluster (e.g., control nodes 102 and worker nodes 104). This snapshot can be used as a backup and can contain information to restore the data lake house equipment. Example use cases for the snapshot can include: backup and restore functionalities; data migration; and active/passive replication. In all these cases the snapshot can contain persistent information such as Kubernetes state (resources, secrets, etc.) and a database backup. It is thus critical that the persistent information in the database be state consistent. A snapshot therefore should not contain inconsistent (or torn) management operations. From the perspective of the snapshot all management operations must be complete.

For the purposes of illustration, discussion is provided for snapshots created for the active/passive replication use case. For active/passive replication there can be at least two data lake house clusters (e.g., data lake house equipment) and they can be configured for replication. One data lake house cluster (e.g., first data lake house equipment) can be the primary and the other data lake house clusters (e.g., second data lake house equipment) can be standbys. Generally, replication is at the entire cluster level. Periodically (e.g., minutes to hours) the data analytics platform 310 wakes up and creates a snapshot archive. The data lake house management software replicates the snapshot archive to the standby site.

Figure 4:
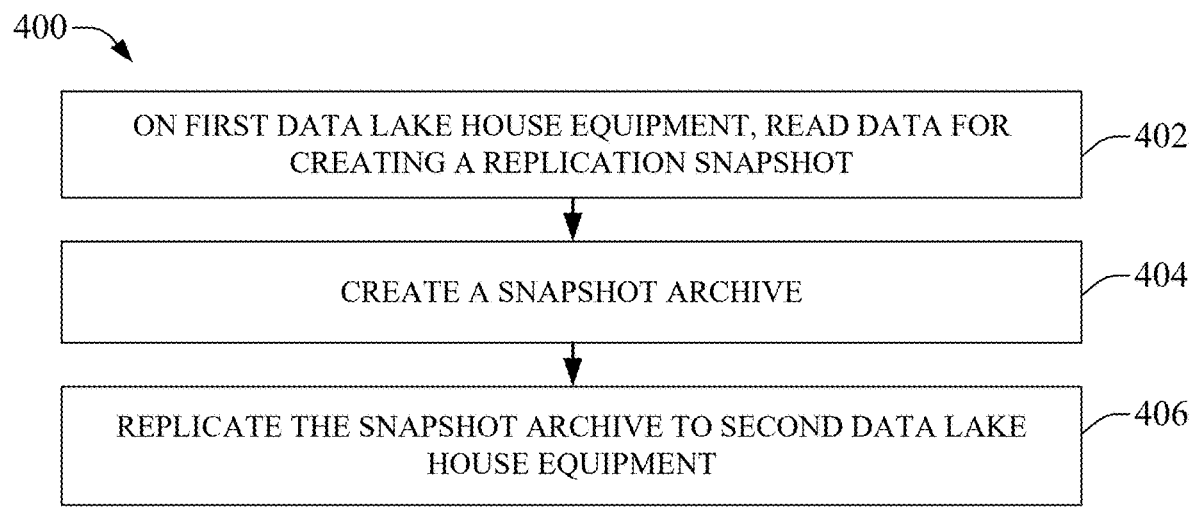
FIG. 4 depicts a method, flow chart, or time sequence, for ensuring snapshot consistency, in accordance with various non-limiting example embodiments.

FIG. 4 illustrates a method 400 for ensuring snapshot consistency in accordance with example embodiments. Method 400 can commence at act 402 where data analytics platform 310, operational on first data lake house equipment, in response to waking up, reads data for generating a snapshot. At act 402 the data analytics platform 310 can read the postgres database (e.g., postgres 306) as well as the created Kubernetes custom resource operation 308. At act 404 the data analytics platform 310 can commence creating a snapshot archive, and thereafter can cause the snapshot archive to be replicated to second data lake house equipment.

The on-going periodic nature of snapshot creation means that there can be more opportunities for a collision between a Kubernetes custom resource operation 308 and snapshot creation. In addition, snapshots can take some time to complete (seconds to minutes). The replication use case increases the probability of snapshot inconsistency. Ensuring snapshot consistency is the basis for this disclosure.

For any management operation, such as a SQL operation, that creates/modifies two persistent resources (e.g., databases) a new Kubernetes custom resource can be instantiated. For purposes of illustration this can be named as an OperationInProgress Custom Resource.

Before any management operation that writes to two or more persistent resources, an OperationInProgress Custom Resource can be created. Then the management operation that writes to the persistent resources can be performed. Once the management operation completes, the OperationInProgress Custom Resource can be deleted.

Each management operation can have their own OperationInProgress Custom Resource (e.g., OperationInProgressCreateDataSource). This can allow each management operation to proceed without a type of global locking that might be introduced with a single OperationInProgress Custom Resource.

The snapshot operator (e.g., data analytics platform 310) can begin by checking if any OperationInProgress Custom Resource instances are present. All OperationInProgress Custom Resource instances are watched, and the snapshot creation is retried once any OperationInProgress Custom Resource instances are removed. If OperationInProgress Custom Resource instances do not exist, a snapshot can be created.

However, it is still possible that a management operation will occur during snapshot creation. To solve this case the disclosed and described snapshot operator (e.g., data analytics platform 310) can be based on a standard Kubernetes operator. A property of Kubernetes operators is the ability to watch for resource creation. In our case the snapshot operator can watch for the creation of an OperationInProgress Custom Resource. If an OperationInProgress Custom Resource is created during snapshot creation, the snapshot can be considered invalid and can be deleted. The snapshot operator will watch the OperationInProgress Custom Resource and retry the operation when the OperationInProgress Custom Resource is deleted.

Figure 5:
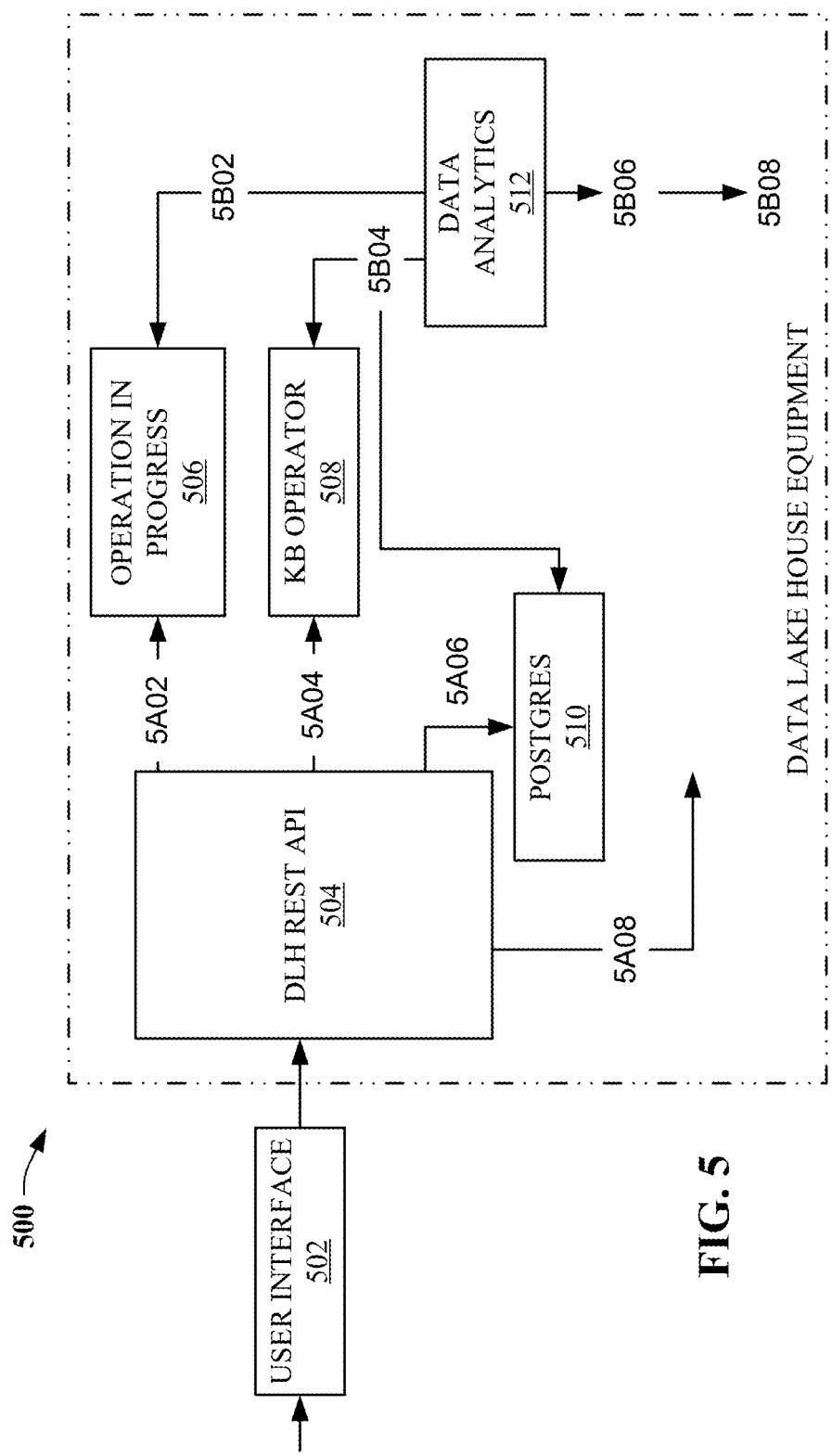
FIG. 5 illustrates block diagram of a system for ensuring snapshot consistency, in accordance with various non-limiting example embodiments.

FIG. 5 provides depiction of data lake house equipment 500 for ensuring snapshot consistency in accordance with various example embodiments. Data lake house equipment 500 can comprise DLH REST API component 504 that has been modified to perform the following actions for a Configure Data Source Operation: (i) the customer, using user interface 502, initiates an management operation; (ii) user interface 502 communicates the management operation to the modified DLH REST API component 504, whereupon an OperationInProgress Custom Resource 506 can be created at act 5A02. The DLH REST API component 504 can then, at act 5A04, create a Kubernetes Custom Resource 508 to drive the redeployment. Thereafter, DLH REST API component 504, at act 5A06, can update data in the postgres database 510, and then delete the created OperationInProgress Custom Resource 506 at act 5A08.

Contemporaneously, with initiating the management operation using the acts enumerated above (e.g., act 5A02, act 5A04, act 5A06, and act 5A08) a snapshot operator (e.g., data analytics platform 512) can determine whether or not an OperationInProgress Custom Resource 506 exists. Generally, where an OperationInProgress Custom Resource 506 exists, the snapshot operator (e.g., data analytics platform 512), at act 5B02, can watch the OperationInProgress Custom Resource 506 to determine when a detected existence of the OperationInProgress Custom Resource 506 has been deleted, at which point the snapshot operator (e.g., data analytics platform 512) retry once the OperationInProgress Custom Resource 506 has been removed. Where an OperationInProgress Custom Resource 506 does not exist (or has recently been deleted) snapshot operator (e.g., data analytics platform 512), at act 5B04, in conjunction with the created Kubernetes Custom Resource 508, can read the data for the snapshot. At act 5B06 the snapshot operator (e.g., data analytics platform 512) can create a snapshot archive that can then be replicated at act 5B08.

Figure 6:
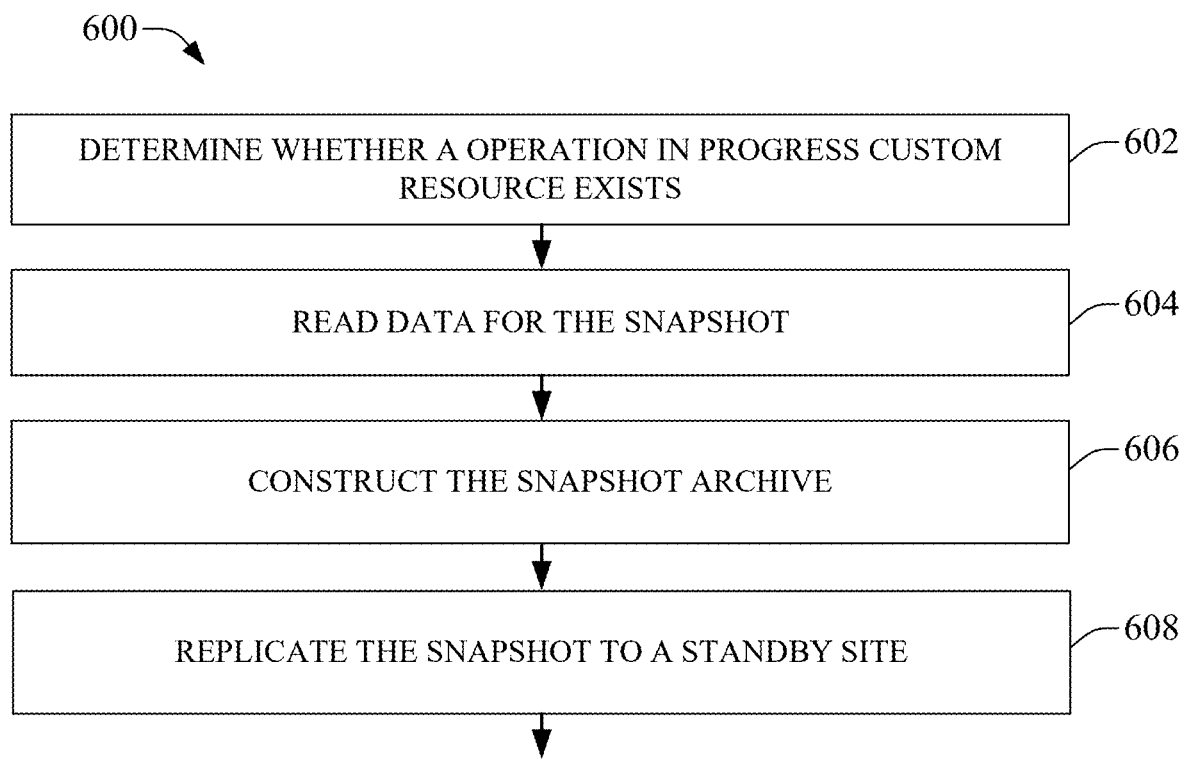
FIG. 6 illustrates another method, flow chart, or time sequence, for ensuring snapshot consistency, in accordance with various non-limiting example embodiments.

FIG. 6 illustrates a method 600 for ensuring snapshot consistency in accordance with various example embodiments. This method can be implemented by a snapshot operator, such as a data analytics platform 512. Method 600 can begin at act 602 where a determination can be made as to whether or not an OperationInProgress Custom Resource exists. Where an OperationInProgress Custom Resource exists, the snapshot operator (e.g., data analytics platform 512), at act 602, can monitor the extant OperationInProgress Custom Resource to determine when the OperationInProgress Custom Resource ceases to exist and/or has been deleted, at which point the snapshot operator (e.g., data analytics platform 512) can retry performing the OperationInProgress Custom Resource. Where an OperationInProgress Custom Resource is determined not to exist (or has recently been deleted) snapshot operator (e.g., data analytics platform 512), at act 604, in conjunction with a created Kubernetes Custom Resource, can read the data for the snapshot. At act 606 the snapshot operator (e.g., data analytics platform 512) can create a snapshot archive that can then be replicated to standby data lake house equipment at act 608.

It should be noted that the pattern described above can be extended to any management operation that creates/modifies at least one persistent data source, such as databases operational on database equipment.

The foregoing leverages Kubernetes custom resources in a unique way to ensure snapshot consistency. For the purposes of the foregoing example exposition, the OperationInProgress Custom Resource has been used as a means of communicating management intent between multiple components. By using Kubernetes custom resources, an agnostic method for using other tools coded using diverse programming languages (e.g., Python, Bash, Go, etc.) can be employed to create the OperationInProgress Custom Resource to queue the snapshot operation to restart later depending on their needs.

Further, support team members, such as an administrative identity, of the data lake house equipment can create an OperationInProgress Custom Resource (e.g., using the kubectl command). In some embodiments, the OperationInProgress Custom Resource can be created manually, whereas in other embodiments, the OperationInProgress Custom Resource can be created using a script.

By way of example, an administrative identity who needs to add a node to a cluster of data lake house equipment can pause and resume snapshots with a script that does not interact with production code. This method does not generally require access to the customer user interface to pause the snapshot operator. Yet it interacts with the system in a well-defined manner that gives confidence in the correctness as opposed to a service tool that may have limited testing.

There can be an issue of starving snapshot creation. By way of example, there can be scenarios where a customer management operation is perfectly timed with the snapshot creation process (e.g., either by coincidence or script). Generally, management data lake house operations are infrequent, but there can always be cases where starvation is an issue.

To address this issue, an exponential back off delay to snapshot creation can be introduced, wherein the exponential back off delay can be representative of a maximum threshold value. Once the maximum threshold value has expired, the snapshot operator (e.g., data analytics platform 512) can perform the following operations: (i) determine whether a OperationInProgress Custom Resource exists, if so, wait until the OperationInProgress Custom Resource is deleted by the management operation, and then create a SnapshotInProgress Custom Resource which can block other management operations; otherwise where the OperationInProgress Custom Resource does not exist, just create the a SnapshotInProgress Custom Resource; (ii) read the data for the snapshot; (iii) construct the snapshot archive; (iv) replicate the snapshot to one or more standby data lake house equipment; and (v) delete the earlier created SnapshotInProgress Custom Resource.

The forgoing operations in the context of averting starvation scenarios allow the snapshot operator (e.g., data analytics platform 512) to block management operations by creating a SnapshotInProgress Custom Resource itself. The management operations respect the Snapshot Operator SnapshotInProgress Custom Resource by waiting until it is deleted before proceeding. This allows the snapshot operator (e.g., data analytics platform 512) to eventually make forward progress and prevent starvation.

Figure 7:
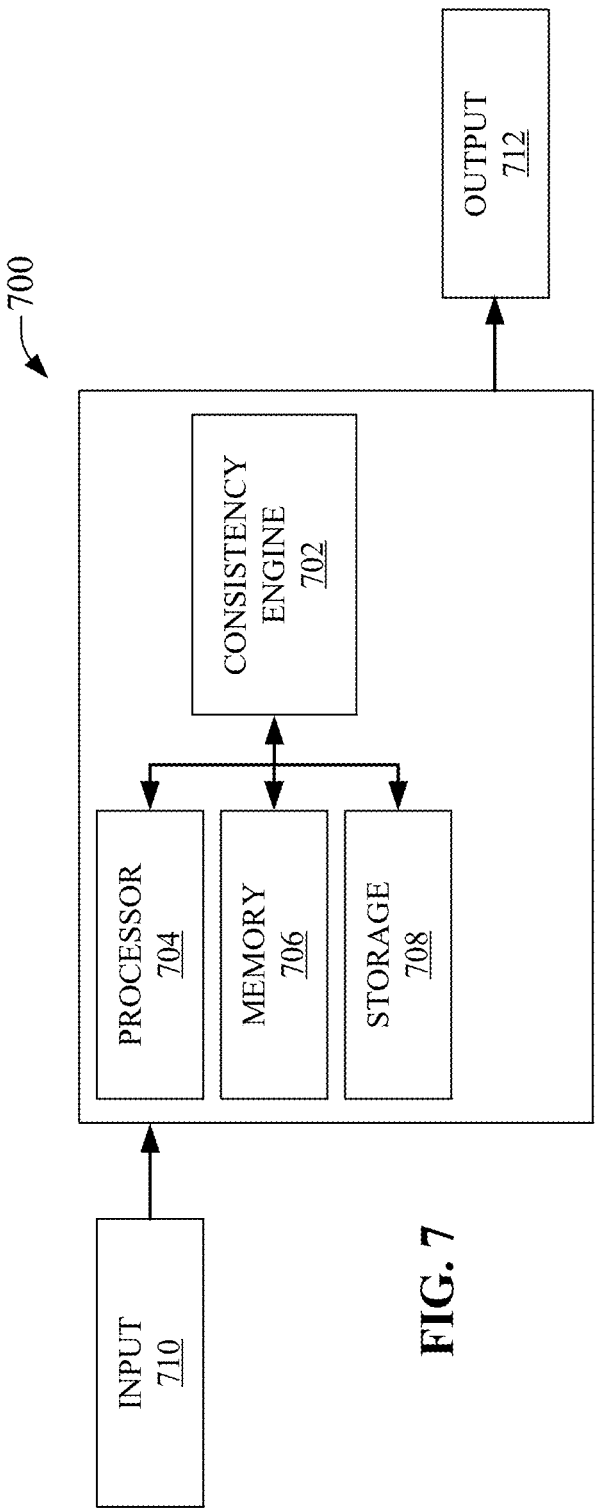
FIG. 7 illustrates a block diagram of a system for ensuring snapshot consistency, in accordance with various non-limiting example embodiments.

FIG. 7 depicts a system 700 for ensuring snapshot consistency in accordance with various example embodiments, in accordance with various non-limiting example embodiments. System 700, for purposes of illustration, can be any type of mechanism, machine, device, facility, apparatus, and/or instrument that includes a processor and/or is capable of effective and/or operative communication with a wired and/or wireless network topology. Mechanisms, machines, apparatuses, devices, facilities, and/or instruments that can comprise system 700 can include tablet computing devices, handheld devices, server class computing equipment, machines, and/or database equipment, laptop computers, notebook computers, desktop computers, cell phones, smart phones, consumer appliances and/or instrumentation, industrial devices and/or components, hand-held devices, personal digital assistants, multimedia Internet enabled phones, Internet of Things (IoT) equipment, multimedia players, and the like.

System 700 can comprise consistency engine 702 that can be in operative communication with processor 704, memory 706, and storage 708. Consistency engine 702 can be in communication with processor 704 for facilitating operation of computer-executable instructions or machine-executable instructions and/or components by consistency engine 702; memory 706 for storing data and/or computer-executable instructions and/or machine-executable instructions and/or components; and storage 708 for providing longer term storage of data and/or machine-readable instructions and/or computer-readable instructions. Additionally, system 700 can also receive input 710 for use, manipulation, and/or transformation by consistency engine 702 to produce one or more useful, concrete, and tangible results, and/or transform one or more articles to different states or things. Further, system 700 can also generate and output the useful, concrete, and tangible result and/or the transformed one or more articles as output 712.

Consistency engine 702 can be implemented on data lake house equipment, such as data lake house equipment 500. Consistency engine 702 can ensure snapshot consistency in accordance with various example embodiments. In some embodiments, consistency engine 702 can implement a DLH REST API that can have been modified to perform the following actions for a Configure Data Source Operation, wherein a customer (e.g., a user identity), using user interface (e.g., user interface 502), initiates, via input 710, a management operation. The management operation can then be communicated to the modified DLH REST API (e.g., DLH REST API component 504). In response to receiving the management operation an OperationInProgress Custom Resource (e.g., OperationInProgress Custom Resource 506) can be created. The modified DLH REST API can then generate and create a Kubernetes Custom Resource (e.g., Kubernetes Custom Resource 508) to drive the redeployment. Thereafter, the modified DLH REST API can update data in a postgres database (e.g., postgres database 510), and then delete the earlier created OperationInProgress Custom Resource.

Contemporaneously, with initiating the management operation, an operational snapshot operator (e.g., data analytics platform 512), under the aegis of consistency engine 702, can determine whether or not an OperationInProgress Custom Resource exists. Generally, where an OperationInProgress Custom Resource exists, the operational snapshot operator can monitor and watch the OperationInProgress Custom Resource to determine when the detected existence of the OperationInProgress Custom Resource has been removed, at which point the snapshot operator can retry once the earlier executing OperationInProgress Custom Resource has been deleted. Where an OperationInProgress Custom Resource is determined not to exist ab initio (or has recently been deleted) the snapshot operator, in conjunction with the created Kubernetes Custom Resource, can read the data for the snapshot. Thereafter the snapshot operator can generate and create a snapshot archive which can then be replicated to standby data lake house equipment.

Figure 8:
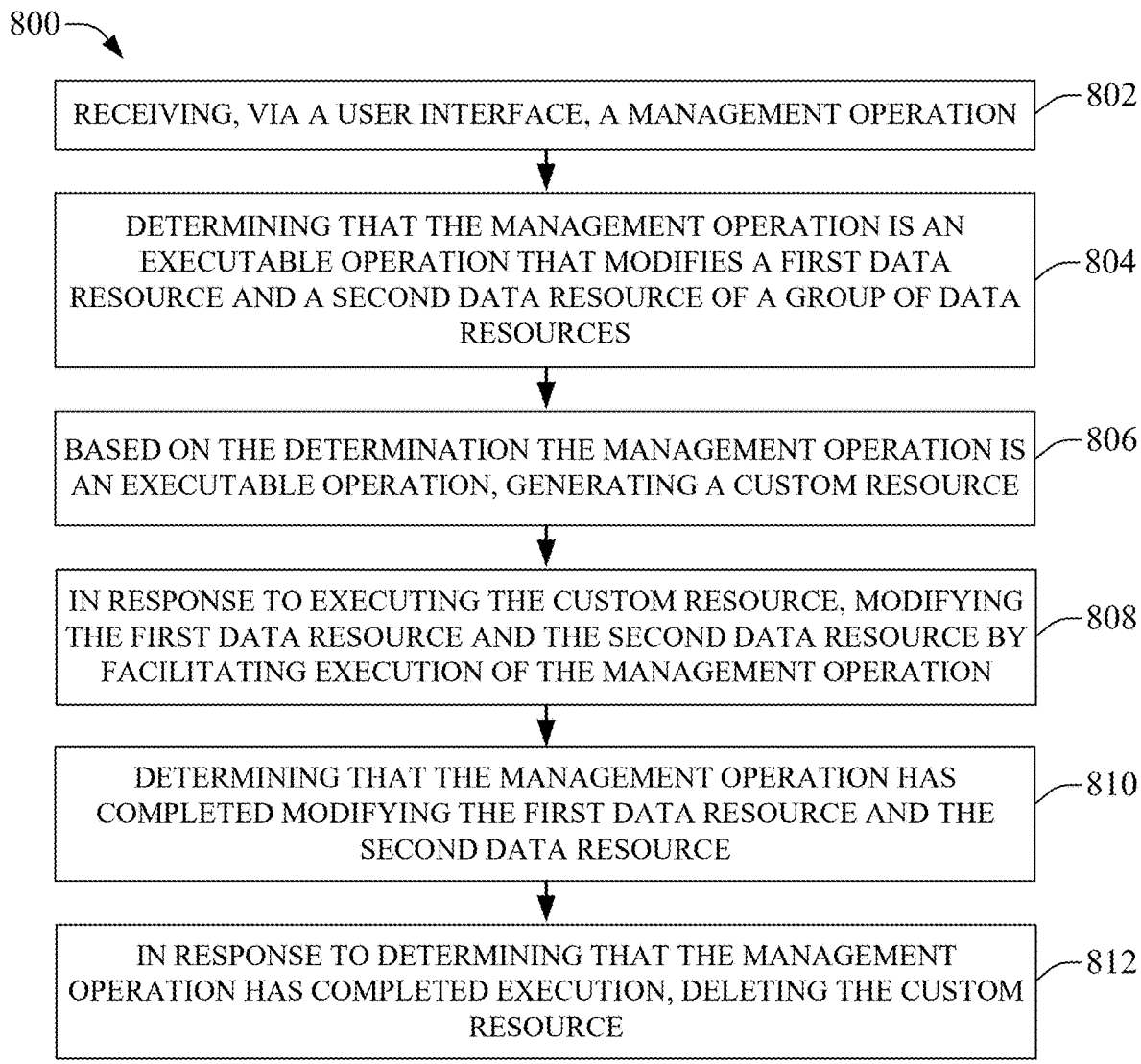
FIG. 8 depicts an additional method, flow chart, or time sequence, for ensuring snapshot consistency, in accordance with various non-limiting example embodiments.

FIG. 8 illustrates an example method 800 for ensuring snapshot consistency in accordance with example embodiments. Method 800 can commence at act 802 where a management operation can be received via a data analytics engine user interface. At act 804 based on the management operation, a determination can be made in regard to whether the management operation is an executable operation that modifies a first data resource of a group of data resources and a second data resource of the group of data resources. At act 806, in response to determining that the management operation is the executable operation that modifies the first data resource and the second data resource, a custom resource representing an operation in progress custom resource can be created and/or generated. At act 808 based on executing the operation in progress custom resource, the first data resource and the second data resource can be modified by facilitating execution of the management operation. At act 810 a determination can be made in regard to whether the management operation has completed modifying the first data resource and the second data resource. At act 812 in response to determining that the management operation has completed execution, the created custom resource can be deleted.

Additional acts that can be associated with the foregoing method, method 8, can include: contemporaneously, with receiving the management operation at act 802, an act to determine whether or not an OperationInProgress Custom Resource exists. In instances where an OperationInProgress Custom Resource is determined to exist, acts of monitoring and watching the OperationInProgress Custom Resource can be performed to determine when the detected existence of the OperationInProgress Custom Resource has been removed. When it is determined that the OperationInProgress Custom Resource no longer exists, an act of retrying can be performed. Where it is determined that an OperationInProgress Custom Resource is non-existent (or has recently been deleted), in conjunction with a created custom resource, a read of the data for a snapshot can be performed. Thereafter, acts associated with generating and creating a snapshot archive, and replicating the snapshot to standby data lake house equipment can be performed.

It will be appreciated by those skilled in the art that the preceding examples and embodiments are exemplary and not limiting to the scope of the present disclosure. It shall also be noted that elements of any claims may be arranged differently including having multiple dependencies, configurations, and combinations.

Figure 9:
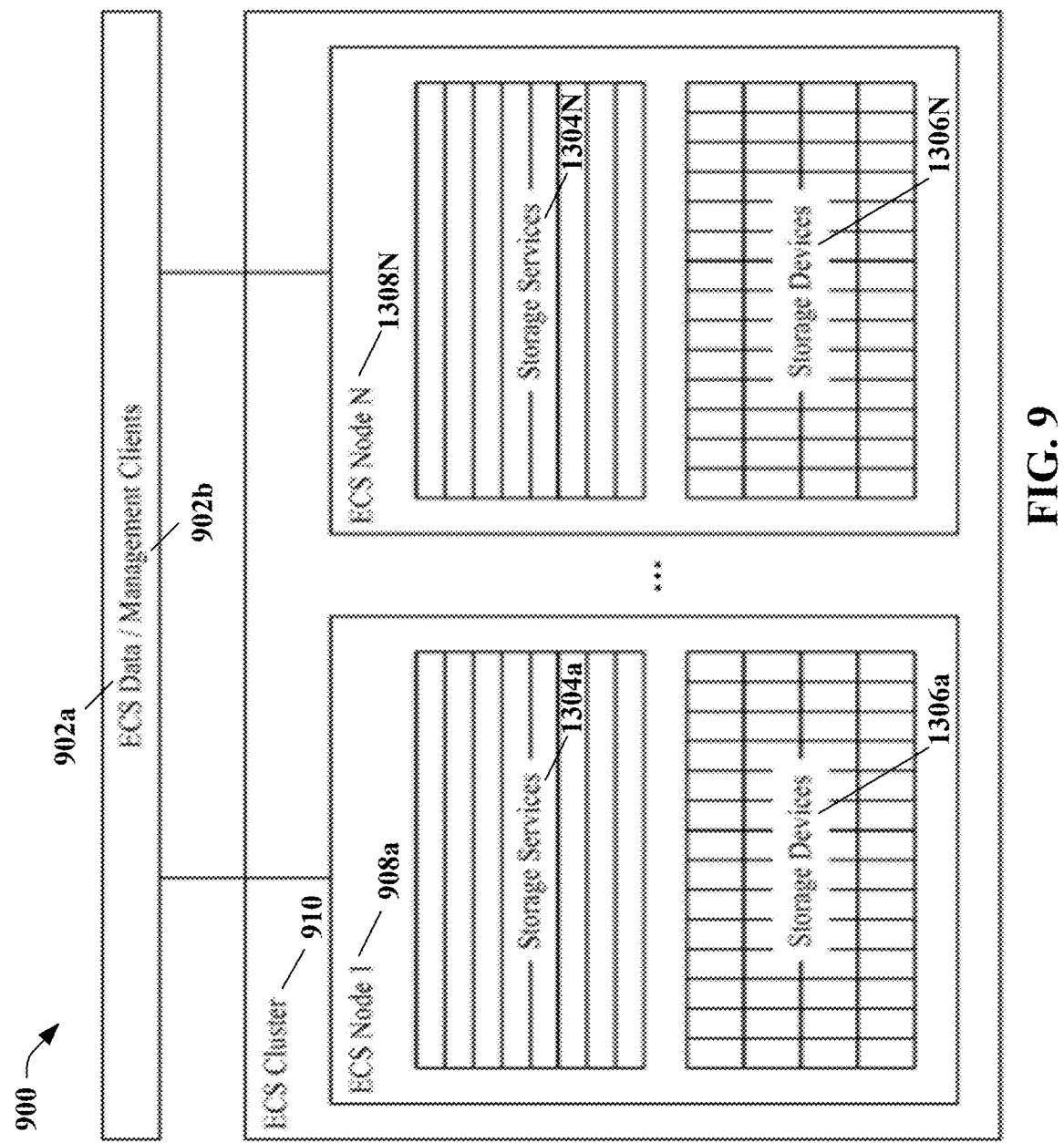
FIG. 9 illustrates a cloud storage system, such as an elastic cloud storage (ECS) system, in accordance with various non-limiting example embodiments.

In the following, FIG. 9 describes an example non-limiting cloud storage system in the non-limiting context of an ECS storage system, but for the avoidance of doubt, the subject embodiments can apply to any storage platform. For instance, in this regard, FIG. 9 illustrates an ECS storage system 900 comprising a cloud-based object storage appliance in which corresponding storage control software comprising, e.g., ECS data client(s) 902a, ECS management client(s) 902b, storage service(s) 904a ... 904N, etc. and storage devices 906a ... 906N (e.g., storage media, such as physical magnetic disk media, etc. of respective ECS nodes of ECS cluster 910) are combined as an integrated system with no access to the storage media other than through the ECS storage system 900.

In this regard, ECS cluster 910 comprises multiple nodes 908a ... 908N, storage nodes, ECS nodes, etc. Each node is associated with storage devices 906a ... 906N, e.g., hard drives, physical disk drives, storage media, etc. In embodiment(s), ECS node 908a, or any ECS node, executing on a hardware appliance can be communicatively coupled, connected, cabled to, etc., e.g., 15 to 120 storage devices. Further, each ECS node can execute one or more services for performing data storage operations described herein.

For instance, the ECS storage system 900 can be an append-only virtual storage platform that protects content from being erased or overwritten for a specified retention period. In particular, the ECS storage system 900 does not employ traditional data protection schemes like mirroring or parity protection. Instead, the ECS storage system 900 utilizes erasure coding for data protection, wherein data, a portion of the data, e.g., a data chunk, is broken into fragments, and expanded and encoded with redundant data pieces and then stored across a set of different locations or storage media, e.g., across different storage nodes.

The ECS storage system 900 can support storage, manipulation, and/or analysis of unstructured data on a massive scale on commodity hardware. As an example, the ECS storage system 900 can support mobile, cloud, big data, and/or social networking applications. In another example, the ECS storage system 900 can be deployed as a turnkey storage appliance, or as a software product that can be installed on a set of qualified commodity servers and disks, e.g., within a node, data storage node, etc. of a cluster, data storage cluster, etc. In this regard, the ECS storage system 900 can comprise a cloud platform that comprises at least the following features: (i) lower cost than public clouds; (ii) unmatched combination of storage efficiency and data access; (iii) anywhere read/write access with strong consistency that simplifies application development; (iv) no single point of failure to increase availability and performance; (v) universal accessibility that eliminates storage silos and inefficient extract, transform, load (ETL)/data movement processes; etc.

In embodiment(s), the cloud-based data storage system can comprise an object storage system, e.g., a file system comprising, but not limited to comprising, a Dell EMC® Isilon file storage system. As an example, a storage engine can write all object-related data, e.g., user data, metadata, object location data, etc. to logical containers of contiguous disk space, e.g., such containers comprising a group of blocks of fixed size (e.g., 128 MB) known as chunks. Data is stored in the chunks and the chunks can be shared, e.g., one chunk can comprise data fragments of different user objects. Chunk content is modified in append-only mode, e.g., such content being protected from being erased or overwritten for a specified retention period. When a chunk becomes full enough, it is sealed, closed, etc. In this regard, content of a sealed, closed, etc. chunk is immutable, e.g., read-only, and after the chunk is closed, the storage engine performs erasure-coding on the chunk.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, the terms "logic," "logical," "logically," and the like are intended to refer to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

As utilized herein, terms "component," "system," "engine", and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server, client, etc. and the server, client, etc. can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. In yet another example, a component can be an apparatus that provides specific functionality through electronic components without mechanical parts; the electronic components can comprise one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art having the benefit of the instant disclosure.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can comprise, but are not limited to: random access memory (RAM); read only memory (ROM); electrically erasable programmable read only memory (EEPROM); flash memory or other memory technology (e.g., card, stick, key drive, thumb drive, smart card); solid state drive (SSD) or other solid-state storage technology; optical disk storage (e.g., compact disk (CD) read only memory (CD ROM), digital video/versatile disk (DVD), Blu-ray disc); cloud-based (e.g., Internet based) storage; magnetic storage (e.g., magnetic cassettes, magnetic tape, magnetic disk storage or other magnetic storage devices); a virtual device that emulates a storage device and/or any of the above computer-readable media; or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used to determine probabilistic likelihoods that code paths utilize operating system synchronization mechanism, as described herein.

A classifier can be a function that maps an input attribute vector, x=(x1, x2, x3, x4, . . . , xn), to a confidence that the input belongs to a class, that is, f (x)=confidence (class). Such classification can employ a probabilistic and/or statistical-based analysis (e.g., factoring into the analysis utilities and costs) to infer an action that a user desires to be automatically performed. In the case of communication systems, for example, attributes can be information received from access points, servers, components of a wireless communication network, etc., and the classes can be categories or areas of interest (e.g., levels of priorities). A support vector machine is an example of a classifier that can be employed. The support vector machine operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein can also be inclusive of statistical regression that is utilized to develop models of priority.

In accordance with various aspects of the subject specification, artificial intelligence based systems, components, etc. can employ classifiers that are explicitly trained, e.g., via a generic training data, etc. as well as implicitly trained, e.g., via observing characteristics of communication equipment, e.g., a server, etc., receiving reports from such communication equipment, receiving operator preferences, receiving historical information, receiving extrinsic information, etc. For example, support vector machines can be configured via a learning or training phase within a classifier constructor and feature selection module. Thus, the classifier(s) can be used by an artificial intelligence system to automatically learn and perform a number of functions.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," "data storage," "database," "storage medium," "socket", and substantially any other information storage component relevant to operation and functionality of a system, component, and/or process, can refer to "memory components," or entities embodied in a "memory," or components comprising the memory. It will be appreciated that the memory components described herein can be either volatile memory or nonvolatile memory, or can comprise both volatile and nonvolatile memory.

By way of illustration, and not limitation, nonvolatile memory, for example, can be included in a data storage cluster, non-volatile memory 1022, disk storage 1024, and/or memory storage 1046, further description of which is below. For instance, nonvolatile memory can be included in read only memory (ROM), programmable ROM (PROM), electrically programmable ROM (EPROM), electrically erasable ROM (EEPROM), or flash memory. Volatile memory 1020 can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 10:
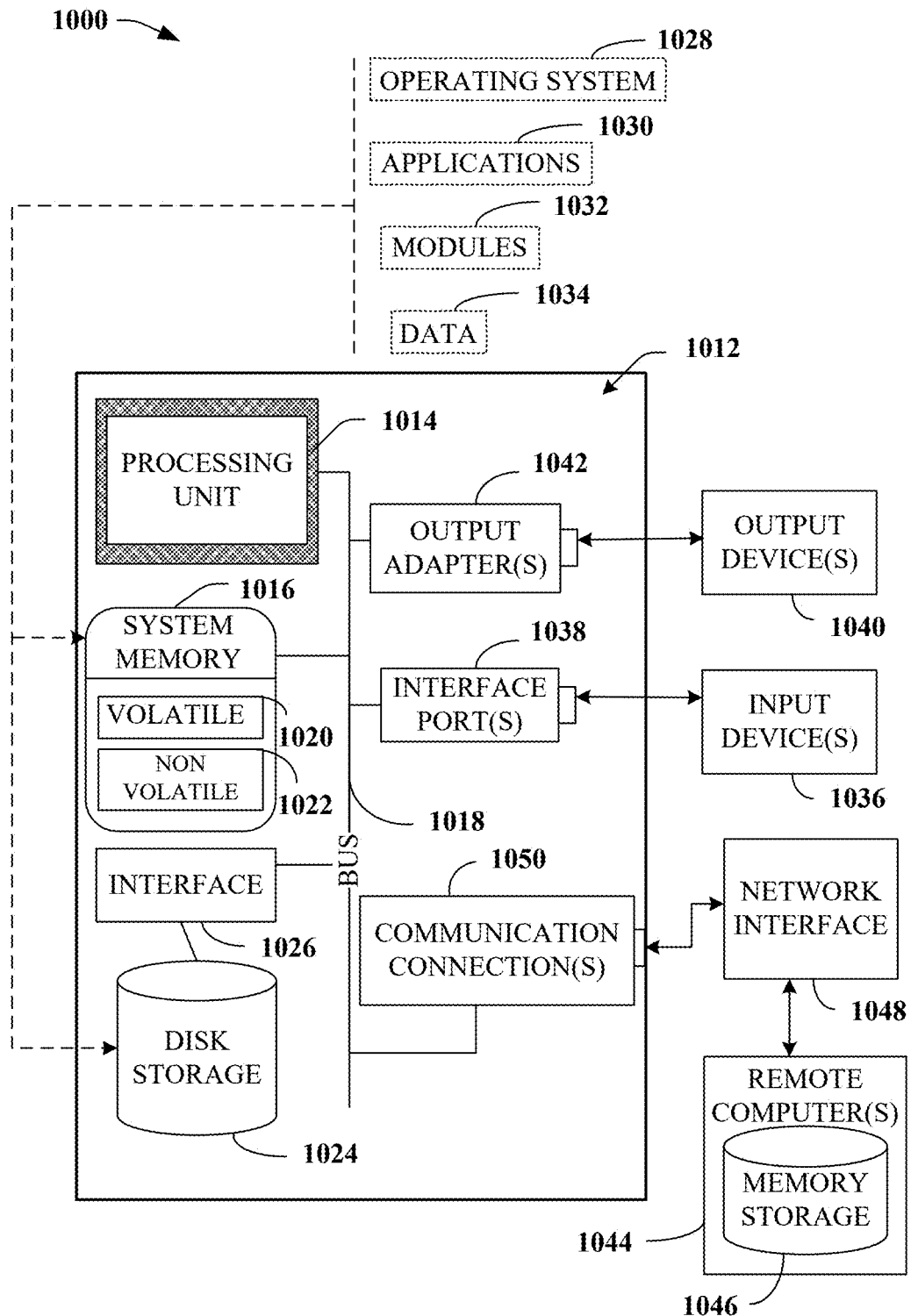
FIG. 10 illustrates a block diagram representing an illustrative non-limiting computing system or operating environment in which one or more aspects of various non-limiting embodiments described herein can be implemented.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that various embodiments disclosed herein can be implemented in combination with other program modules. Generally, program modules comprise routines, programs, components, data structures, etc. that perform particular tasks and/or implement particular abstract data types.

Moreover, those skilled in the art will appreciate that the inventive systems can be practiced with other computer system configurations, comprising single-processor or multiprocessor computer systems, computing devices, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communication network; however, some if not all aspects of the subject disclosure can be practiced on stand-alone computers. In a distributed computing environment, program modules can be located in both local and remote memory storage devices.

FIG. 10, a block diagram of a computing system 1000, e.g., system 700, operable to execute the disclosed example embodiments, is illustrated, in accordance with an embodiment. Computer 1012 comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture (ISA), micro-channel architecture (MSA), extended ISA (EISA), intelligent drive electronics (IDE), VESA local bus (VLB), peripheral component interconnect (PCI), card bus, universal serial bus (USB), advanced graphics port (AGP), personal computer memory card international association bus (PCMCIA), Firewire (IEEE 1394), small computer systems interface (SCSI), and/or controller area network (CAN) bus used in vehicles.

System memory 1016 comprises volatile memory 1020 and nonvolatile memory 1022. A basic input/output system (BIOS), containing routines to transfer information between elements within computer 1012, such as during start-up, can be stored in nonvolatile memory 1022. By way of illustration, and not limitation, nonvolatile memory 1022 can comprise ROM, PROM, EPROM, EEPROM, or flash memory. Volatile memory 1020 comprises RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also comprises removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media comprising, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to system bus 1018, a removable or non-removable interface is typically used, such as interface 1026.

It is to be appreciated that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be appreciated that the disclosed subject matter can be implemented with various operating systems or combinations of operating systems.

A user can enter commands or information into computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1014 through system bus 1018 via interface port(s) 1038. Interface port(s) 1038 comprise, for example, a serial port, a parallel port, a game port, a universal serial bus (USB), a wireless based port, e.g., Wi-Fi, Bluetooth, etc. Output device(s) 1040 use some of the same type of ports as input device(s) 1036.

Thus, for example, a USB port can be used to provide input to computer 1012 and to output information from computer 1012 to an output device 1040. Output adapter 1042 is provided to illustrate that there are some output devices 1040, like display devices, light projection devices, monitors, speakers, and printers, among other output devices 1040, which use special adapters. Output adapters 1042 comprise, by way of illustration and not limitation, video and sound devices, cards, etc. that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, a workstation, a microprocessor based appliance, a peer device, or other common network node and the like, and typically comprises many or all of the elements described relative to computer 1012.

For purposes of brevity, only a memory storage device 1046 is illustrated with remote computer(s) 1044. Remote computer(s) 1044 is logically connected to computer 1012 through a network interface 1048 and then physically and/or wirelessly connected via communication connection 1050. Network interface 1048 encompasses wire and/or wireless communication networks such as local-area networks (LAN) and wide-area networks (WAN). LAN technologies comprise fiber distributed data interface (FDDI), copper distributed data interface (CDDI), Ethernet, token ring and the like. WAN technologies comprise, but are not limited to, point-to-point links, circuit switching networks like integrated services digital networks (ISDN) and variations thereon, packet switching networks, and digital subscriber lines (DSL).

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and DSL modems, wireless modems, ISDN adapters, and Ethernet cards.

The computer 1012 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1012 can connect to other devices/networks by way of antenna, port, network interface adaptor, wireless access point, modem, and/or the like.

The computer 1012 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This comprises at least Wi-Fi and Bluetooth wireless technologies. Thus, the communication can be a predefined structure as with a conventional network or simply an ad hoc communication between at least two devices.

Wi-Fi allows connection to the Internet from a desired location (e.g., a vehicle, couch at home, a bed in a hotel room, or a conference room at work, etc.) without wires. Wi-Fi is a wireless technology similar to that used in a cell phone that enables such devices, e.g., mobile phones, computers, etc., to send and receive data indoors and out, anywhere within the range of a base station. Wi-Fi networks use radio technologies called IEEE 802.11 (a, b, g, etc.) to provide secure, reliable, fast wireless connectivity. A Wi-Fi network can be used to connect communication devices (e.g., mobile phones, computers, etc.) to each other, to the Internet, and to wired networks (which use IEEE 802.3 or Ethernet). Wi-Fi networks operate in the unlicensed 2.4 and 5 GHz radio bands, at a 10 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating there from. Therefore, the disclosed subject matter should not be limited to any single embodiment described herein, but rather should be construed in breadth and scope in accordance with the appended claims below.

What is claimed is:

1. Database equipment, comprising:
   at least one processor; and
   at least one memory that stores executable instructions that, when executed by the at least one processor, facilitate performance of operations, comprising:
   receiving, via a data analytics engine user interface, a management operation;
   determining, based on the management operation, that the management operation is executable to modify a first data resource of a group of data resources and a second data resource of the group of data resources;
   in response to determining that the management operation is executable operation to modify the first data resource and the second data resource, generating a custom resource representing an operation in progress custom resource;
   based on executing the operation in progress custom resource, modifying the first data resource and the second data resource comprising execution of the management operation;
   determining that the management operation has completed modifying the first data resource and the second data resource; and
   in response to determining that the management operation has completed the modifying, deleting the custom resource.

2. The database equipment of claim 1, wherein the management operation is a database creation and schema management operation.

3. The database equipment of claim 1, wherein the management operation is a data manipulation operation.

4. The database equipment of claim 1, wherein the management operation is a performance optimization operation.

5. The database equipment of claim 1, wherein the management operation is a backup operation or a restore operation.

6. The database equipment of claim 1, wherein the management operation is a security management operation.

7. The database equipment of claim 1, wherein the management operation is a data integrity and consistency operation.

8. The database equipment of claim 1, wherein the management operation is a monitoring and diagnostics operation.

9. The database equipment of claim 1, wherein the management operation is a database scaling operation.

10. The database equipment of claim 1, wherein the management operation is a relational database management system structured query language operation.

11. The database equipment of claim 1, wherein the management operation is for storage and retrieval of unstructured data that is not modeled using a tabular relationship as used in relational databases.

12. A method, comprising:
in response to receiving a management operation from a data analytics engine user interface, determining, by equipment comprising one or more processor, that the management operation is an executable operation that modifies a first data resource of a group of data resources and a second data resource of the group of data resources;
based on the management operation being determined to be the executable operation, generating, by the equipment, a custom resource representing an operation in progress custom resource;
in response to executing the operation in progress custom resource, modifying, by the equipment, the first data resource and the second data resource by facilitating execution of the management operation;
determining, by the equipment, that the management operation has completed modifying the first data resource and the second data resource; and
in response to determining that the management operation has completed execution, deleting, by the equipment, the custom resource.

13. The method of claim 12, wherein the custom resource is a first custom resource, and further comprising, prior to generating the first custom resource, determining, by the equipment, that the operation in progress custom resource is in execution.

14. The method of claim 13, further comprising, in response to determining that the operation in progress custom resource is in execution, monitoring, by the equipment, the group of resources to determine a time instance when the first custom resource has completed execution.

15. The method of claim 13, further comprising, in response to determining that the operation in progress custom resource has completed execution, instantiating, by the equipment, a second custom resource.

16. The method of claim 12, wherein the data analytics engine is a database query engine that supports high performance analytics across a collection of data sources.

17. A non-transitory machine-readable medium, comprising executable instructions that, when executed by a network device comprising at least one processor, facilitate performance of operations, comprising:
in response to receiving a management operation from a data analytics engine user interface, determining that the management operation is executable to manipulate a first data resource of a group of data resources and a second data resource of the group of data resources;
based on the management operation being determined to be executable, generating a custom resource representing an operation in progress custom resource;
in response to executing the operation in progress custom resource and based on executing the management operation, manipulating the first data resource and the second data resource;
determining that the management operation has completed the manipulating of the first data resource and the second data resource; and
in response to determining that the management operation has completed the manipulating of the first data resource and the second data resource, deleting the custom resource.

18. The non-transitory machine-readable medium of claim 17, wherein the data analytics engine is a database query engine that supports high performance analytics across a collection of data sources.

19. The non-transitory machine-readable medium of claim 18, wherein a data source of the collection of data sources is a non-relational database management system data source that facilitates management of groups of unstructured data sets.

20. The non-transitory machine-readable medium of claim 18, wherein a data source of the collection of data sources is an object storage data management system data source.

* * * * *